(12) United States Patent
Tanaka et al.

(10) Patent No.: US 9,650,825 B2
(45) Date of Patent: May 16, 2017

(54) VEHICLE DOOR

(71) Applicant: HONDA MOTOR CO., LTD., Minato-Ku, Tokyo (JP)

(72) Inventors: Yuya Tanaka, Wako-Shi (JP); Jun Nakamura, Wako-Shi (JP); Takahiro Kawase, Wako-Shi (JP); Takayuki Kobayashi, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/914,389

(22) PCT Filed: Aug. 29, 2014

(86) PCT No.: PCT/JP2014/072754
§ 371 (c)(1),
(2) Date: Feb. 25, 2016

(87) PCT Pub. No.: WO2015/030181
PCT Pub. Date: Mar. 5, 2015

(65) Prior Publication Data
US 2016/0208535 A1  Jul. 21, 2016

(30) Foreign Application Priority Data

Sep. 2, 2013  (JP) .................................. 2013-181294

(51) Int. Cl.
*E05F 11/38*  (2006.01)
*E05D 15/16*  (2006.01)
(Continued)

(52) U.S. Cl.
CPC ............. *E05F 11/385* (2013.01); *B60J 1/004* (2013.01); *E05D 15/16* (2013.01); *E05F 11/382* (2013.01);
(Continued)

(58) Field of Classification Search
CPC ..... E05F 11/385; E05F 11/387; E05F 11/689; E05F 11/488; E05F 11/486; E05F 11/483;
(Continued)

(56) References Cited

U.S. PATENT DOCUMENTS 5,513,468 A * 5/1996 Diestelmeier ......... E05F 11/385
  49/351
5,546,704 A * 8/1996 Maruoka .................... B60J 1/17
  49/375

(Continued)

FOREIGN PATENT DOCUMENTS

JP  H09-095129 A  4/1997
JP  2000-355218 A  12/2000
(Continued)

*Primary Examiner* — Justin Rephann
(74) *Attorney, Agent, or Firm* — Carrier Blackman & Associates, P.C.; Joseph P. Carrier; Anne G. Sabourin

(57) ABSTRACT

A vehicle door is provided with: a rear glass holder that holds door glass and has a first rear fastening hole: and a carrier plate having a second rear fastening hole fastened to the first rear fastening hole. The rear glass holder has a first rear engagement section. The carrier plate has a second engagement section engaged by the first rear engagement section. In the engaged state, the first rear fastening hole is offset below the second fastening hole. The offset amount of the first rear fastening hole and the second rear fastening hole is greater than the engagement margin of the first rear engagement section and the second engagement section.

17 Claims, 13 Drawing Sheets

(51) Int. Cl.
*B60J 1/00* (2006.01)
*E05F 15/689* (2015.01)

(52) U.S. Cl.
CPC ......... *E05F 15/689* (2015.01); *E05Y 2600/56* (2013.01)

(58) Field of Classification Search
CPC ......... E05F 11/445; E05D 15/16; B60J 1/004; E05Y 2600/56
USPC .......................................................... 49/375
See application file for complete search history.

(56) References Cited

U.S. PATENT DOCUMENTS

| | | | | |
|---|---|---|---|---|
| 5,729,930 | A * | 3/1998 | Schust | B60J 1/17 49/372 |
| 5,809,695 | A * | 9/1998 | Strickland | E05F 11/488 49/352 |
| 5,966,872 | A * | 10/1999 | Wasek | E05F 11/385 49/348 |
| 6,119,403 | A * | 9/2000 | Klippert | E05F 11/382 49/375 |
| 6,330,764 | B1 * | 12/2001 | Klosterman | B60J 1/17 49/375 |
| 6,519,898 | B2 * | 2/2003 | Tatsumi | E05F 11/385 49/375 |
| 6,598,345 | B1 * | 7/2003 | Arimoto | E05F 11/385 49/352 |
| 7,802,401 | B2 * | 9/2010 | Wild | E05F 11/382 49/352 |
| 8,388,044 | B2 | 3/2013 | Saito et al. | |
| 2002/0017061 | A1 * | 2/2002 | Nicolai | E05F 11/385 49/375 |
| 2003/0110702 | A1 * | 6/2003 | Capriotti | E05F 11/385 49/375 |
| 2004/0107645 | A1 * | 6/2004 | Galliani | B60J 1/17 49/375 |
| 2004/0154227 | A1 * | 8/2004 | Yoshimura | E05F 11/385 49/352 |
| 2007/0294951 | A1 * | 12/2007 | Tenorio | E05F 11/382 49/375 |
| 2008/0222857 | A1 * | 9/2008 | Twork | E06B 3/54 24/541 |
| 2009/0090064 | A1 * | 4/2009 | Tudora | E05F 11/385 49/348 |
| 2009/0223133 | A1 * | 9/2009 | Miu | E05F 11/385 49/375 |
| 2010/0043297 | A1 * | 2/2010 | Barr | E05F 11/385 49/375 |
| 2011/0225888 | A1 * | 9/2011 | Aschmutat | E05F 11/382 49/352 |
| 2014/0086668 | A1 * | 3/2014 | Lee | E06B 3/5481 403/187 |

FOREIGN PATENT DOCUMENTS

| | | |
|---|---|---|
| JP | 2011-063158 A | 3/2011 |
| JP | 2012-246718 A | 12/2012 |
| JP | 2013-124538 A | 6/2013 |

* cited by examiner

VEHICLE DOOR

TECHNICAL FIELD

The present invention relates to a vehicle door in which a door glass is held by a glass holder which in turn is mounted in a door body via a support plate.

BACKGROUND ART

There are known vehicle doors in which a glass holder is mounted on a lower end portion of a door glass, the glass holder is inserted into a mounting hole of a guide rail (hereinbelow referred to as "support plate"), and the glass holder is secured to a support plate with the glass holder arranged on the support plate.

The glass holder is inserted into the mounting hole of the support plate when the door glass is mounted on the support plate, whereby the glass holder (i.e., door glass) can be positioned with respect to the door body (see, e.g., Patent Literature 1).

However, in the vehicle door of Patent Literature 1, the glass holder is arranged on the support plate with the glass holder secured to the support plate. In other words, the glass holder is in contact with the support plate.

Consequently, it is thought that the guide rail and the glass holder interfere with each other due, inter alia, to vibration generated during vehicle travel, and unwanted sound (noise) is caused by the interference.

PRIOR ART LITERATURE

Patent Literature 1: JP H09-095129 A

SUMMARY OF INVENTION

Technical Problem

An object of the present invention is to provide a vehicle door in which a door glass can be positioned with respect to a door body and in which interference-induced noise is suppressed.

Solution to Problem

In accordance with the invention, there is provided a vehicle door provided with a door glass supported by a door body; a glass holder for holding the door glass and having a first fastening hole; and a support plate that corresponds to the first fastening hole of the glass holder and has a second fastening hole fastened to glass holder by a fastening member, wherein the glass holder has a first engagement section formed in a concavoconvex shape in the vertical direction; the support plate has a second engagement section engaged by the first engagement section in any location in substantially the horizontal direction; the first fastening hole is offset further downward than the second fastening hole once the first engagement section has engaged with the second engagement section; and the offset amount of the first fastening hole and the second fastening hole is greater than the engagement margin of the first engagement section and the second engagement section.

It is preferable that the first engagement section comprise a plurality of recesses and protrusions formed in continuous alternating fashion while the second engagement section be formed with a convex shape capable of engaging the recesses.

Preferably, there is a single second engagement section.

When there is a plurality of second engagement sections, a plurality of first engagement sections must engage the plurality of second engagement sections. Consequently, the plurality of first engagement sections and the plurality of second engagement sections must be formed precisely. Inasmuch, a single second engagement section is formed in the third aspect.

Preferably, one of the protrusions and the recesses in the first engagement section is formed smoothly curved while the other is formed with an acute triangular shape.

The recesses and the protrusions become excessively high when both the first engagement sections (recesses and protrusions) are formed in an acute triangular shape. Consequently, it becomes too difficult to remove the first engagement section from the second engagement section when the first engagement section has been fitted to the second engagement section in order to position the door glass in a normal position.

Meanwhile, the recesses and the protrusions become excessively short when both the first engagement sections (recesses and protrusions) are formed in a smooth curved shape. Hence, the first engagement section is too easily removed from the second engagement section when the first engagement section has been fitted to the second engagement section in order to position the door glass in a normal position. Accordingly, it is possible that the door glass will become displaced from the normal position.

Inasmuch, the protrusions and recesses in the first engagement section are formed smoothly curved, and the other is formed with an acute triangular shape.

It is desirably that the door glass be held by a plurality of the glass holders and the second engagement section be provided only in a position corresponding to the first engagement section provided to a single glass holder selected from a plurality of the glass holders.

It is difficult to cause a plurality of first engagement sections and second engagement sections of a plurality of glass holders to advantageously engage (mesh) when the second engagement sections are caused to engage with all of the first engagement sections.

Preferably, the second engagement section is provided only in a position corresponding to the first engagement section of a single glass holder.

It is preferable that the support plate comprise a placement section that allows the glass holder to be placed with a lower surface facing downward, the second engagement section being provided to the support plate, and the first engagement section be provided to the lower surface of the glass holder.

Preferably, the support plate comprises: a pressing section provided toward the vehicle interior relative to the glass holder, the pressing section protruding upward so as to oppose the glass holder; and a fastening wall that opposes the glass holder by being provided to the vehicle exterior side of the glass holder, and in which the second fastening hole is formed.

It is preferably that the support plate be a plastic member, the second engagement section and the pressing section be provided in an overlapping position in the lateral direction, and the second engagement section be formed on the parting line trace of the support plate.

Preferably, the first engagement section is provided to the lower surface of the glass holder over substantially the entire lateral direction while the second engagement section is provided so as to straddle the fastening wall and the pressing section.

Advantageous Effects of Invention

In the present invention, the glass holder has a first engagement section, and the support plate has a second engagement section. Consequently, causing the first engagement section to engage the second engagement section enables the glass holder to be held in a desired position of the door body. Thus, by holding the glass holder using the first engagement section and the second engagement section, the door glass can be placed in a normal position with respect to the door body.

Once the first engagement section has engaged with the second engagement section, the first fastening hole is offset downward from the second fastening hole. Furthermore, the amount of offset of the first fastening hole and the second fastening hole is increased to be greater than the engagement margin of the first engagement section and the second engagement section.

Consequently, a fastening member is passed through the first fastening hole and the second fastening hole, and with the glass holder fastened to the support plate, the first engagement section can be lifted above the second engagement section. The first engagement section and the second engagement section are thereby set apart and noise generated by interference between the first engagement section and the second engagement section can be suppressed.

In the invention, the first engagement section is formed by a plurality of recesses and a plurality of protrusions, and the second engagement section is formed with a convex shape. Consequently, an optimal recess can be selected from the plurality of recesses, and the selected recess can be caused to engage the second engagement section.

The glass holder (i.e., the door glass) can thereby be precisely positioned in a predetermined position.

In the invention, a single second engagement section is formed. Consequently, the glass holder (door glass) can be positioned in a predetermined position by merely causing the first engagement section to engage a single second engagement section.

It is thereby possible to reduce precision when the first rear engagement section and/or the second engagement section are formed (molded) to a greater extent than when a plurality the first rear engagement sections is caused to engage with a plurality of the second engagement sections.

In the invention, the protrusions or recesses in the first engagement section are formed smoothly curved, and the other is formed with an acute triangular shape. The height of the recesses and the protrusions can be kept to an optimum value.

Consequently, the first engagement section can be made less liable to dislodge from the second engagement section and the door glass can be stably positioned in a proper position when the first engagement section is fitted to the second engagement section in order to position the door glass in a normal position.

Keeping the height of the recesses and the protrusions to an optimal value makes it possible to easily remove the first engagement section from the second engagement section after the first engagement section has been fitted to the second engagement section.

Thus, the door glass can be stably positioned in a normal position, and the first engagement section can be readily removed from the second engagement section. Work for attaching the door glass in a normal position can thereby be carried out without a laborious procedure.

In the invention, the second engagement section is provided only in a position corresponding to the first engagement section provided to a single glass holder. Consequently, there is no need to cause a plurality of the first engagement sections to individually engage (mesh with) a plurality of second engagement sections.

The first engagement section can thereby be caused to satisfactorily engage the second engagement section, and the door glass can easily be positioned in a normal position.

In the invention, the second engagement section is provided to a placement section of the support plate, and the first engagement section is provided to the lower surface of the glass holder. Also, the first engagement section is causes to engage the second engagement section from above.

Consequently, the engaged state of the first engagement section and the second engagement section can be satisfactorily maintained using the deadweight of the door glass and/or the glass holder. The glass holder (door glass) can thereby be precisely positioned in a predetermined position.

In the invention, a pressing section and a fastening wall are provided to the support plate. The pressing section is provided to the vehicle interior side from the glass holder, and the fastening wall is provided to the vehicle exterior side of the glass holder.

Consequently, the pressing section and the fastening wall can be held with the glass holder placed on the placement section of the support plate. Also, the glass holder is caused to follow along the fastening wall, thereby making it possible to prevent the glass holder from falling inward.

Work for attaching the door glass in a normal position can thereby be carried out without a laborious procedure.

In the invention, the support plate is formed (molded) as a plastic member, and the second engagement section is formed on the parting line trace of the support plate. Consequently, the second engagement section can be formed using the mold-dividing line (parting line) of a mold when the support plate is molded with a mold (metal mold).

Other locations of the support plate can thereby be molded without being affected by the second engagement section, and the molding precision of other locations of the support plate can therefore be increased.

In this case, a slide mold must be used as the mold in order to mold the pressing section.

Inasmuch, the second engagement section and the pressing section are provided in overlapping positions. The second engagement section can thereby be molded and the mold can be simplified using a slide mold for molding the pressing section.

In the ninth aspect of the present invention, the first engagement section is provided to the lower surface of the glass holder for substantially the entire lateral direction. Consequently, the first engagement section can be formed to the vicinity of the end section on the vehicle exterior side and/or the end section on the vehicle interior side of the glass holder (lower surface).

Furthermore, the second engagement section is provided so as to straddle (cross) the fastening wall and the pressing section.

Consequently, the first engagement section formed in the vicinity of the end section on the vehicle exterior side and/or the end section on the vehicle interior side can be caused to engage the second engagement section when the glass holder is tilted slightly to the vehicle exterior side or the vehicle interior side.

The glass holder (door glass) can thereby be precisely positioned in a predetermined position.

DESCRIPTION OF EMBODIMENTS

A preferred embodiment for carrying out the present invention is described below with reference to the attached drawings. "Front (Fr)," "rear (Rr)," "left (L)," and "right (R)" indicate directions as viewed from a driver.

Embodiment

A vehicle door 10 according to an embodiment will be described.

A front side door provided to the front of a vehicle will be described as the vehicle door 10 of the embodiment, but no limitation is imposed thereby; a rear side door and/or a rear door can also be used as the vehicle door 10.

Figure 1:
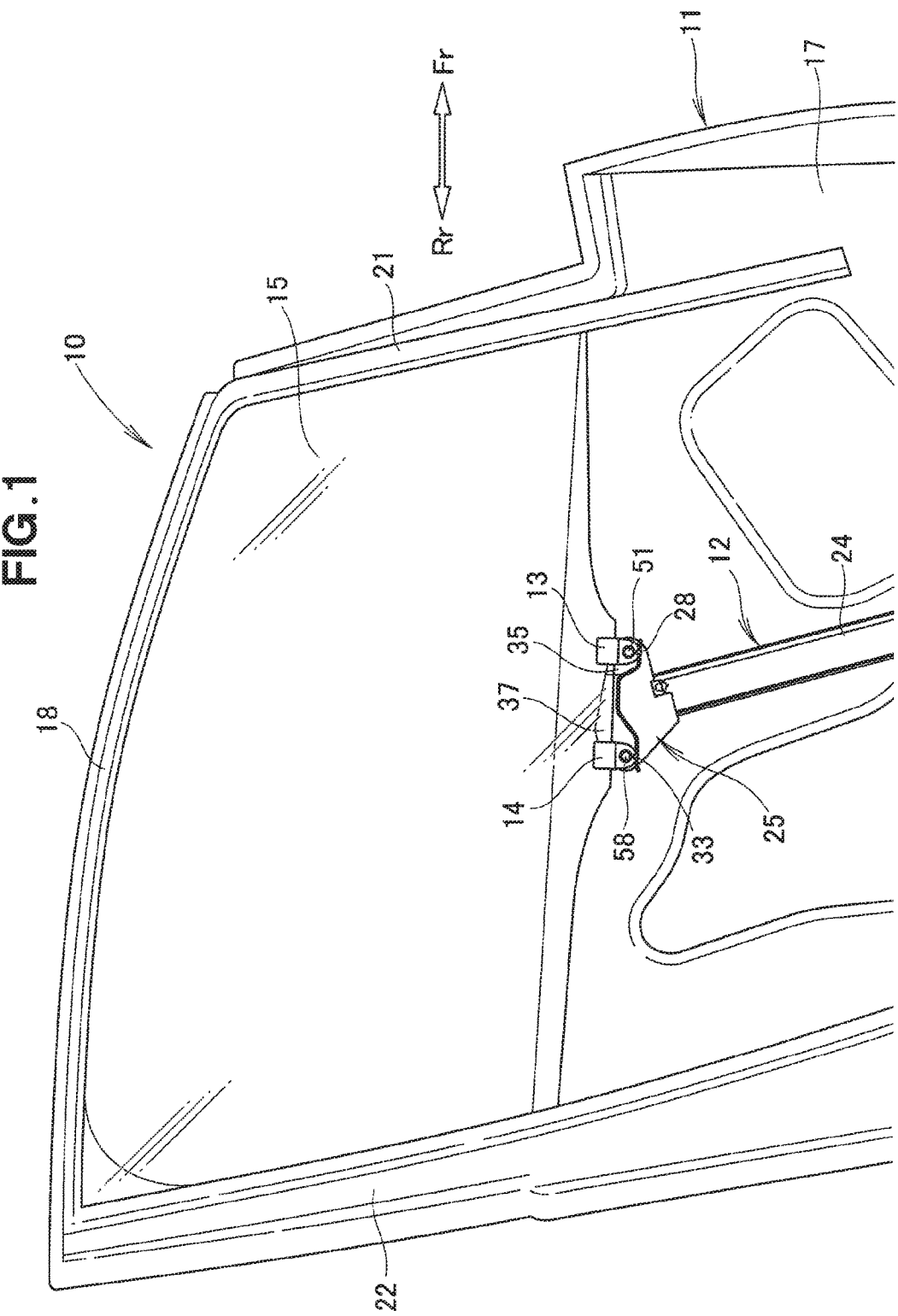
FIG. 1 is a plan view of a vehicle door according to the present invention, as seen from the vehicle interior side.

As shown in FIG. 1, the vehicle door 10 is provided with a door body 11 openably/closably provided to a door opening section of a vehicle body, elevator means 12 provided to the door body 11, front and rear glass holders 13, 14 attached to the elevator means 12, and a door glass 15 held by the front and rear glass holders 13, 14.

The door body 11 is provided with a door panel 17 openably/closably supported by the door opening section of the vehicle body, and a door sash 18 provided to the door panel 17. The door sash 18 is provided with a front sash 21 provided to the front end section side of the door panel 17, and a rear sash 22 provided to the rear end section side of the door panel 17.

The front sash 21 extends in the vertical direction on the front end section side of the door panel 17. The rear sash 22 extends in the vertical direction on the rear end section side of the door panel 17.

The elevator means 12 is provided to the door panel 17.

The elevator means 12 is provided with a guide section 24 extending in the vertical direction, and a carrier plate (support plate) 25 elevatably supported along the guide section 24, and a drive motor (not shown) for elevating the carrier plate 25.

Figure 2:
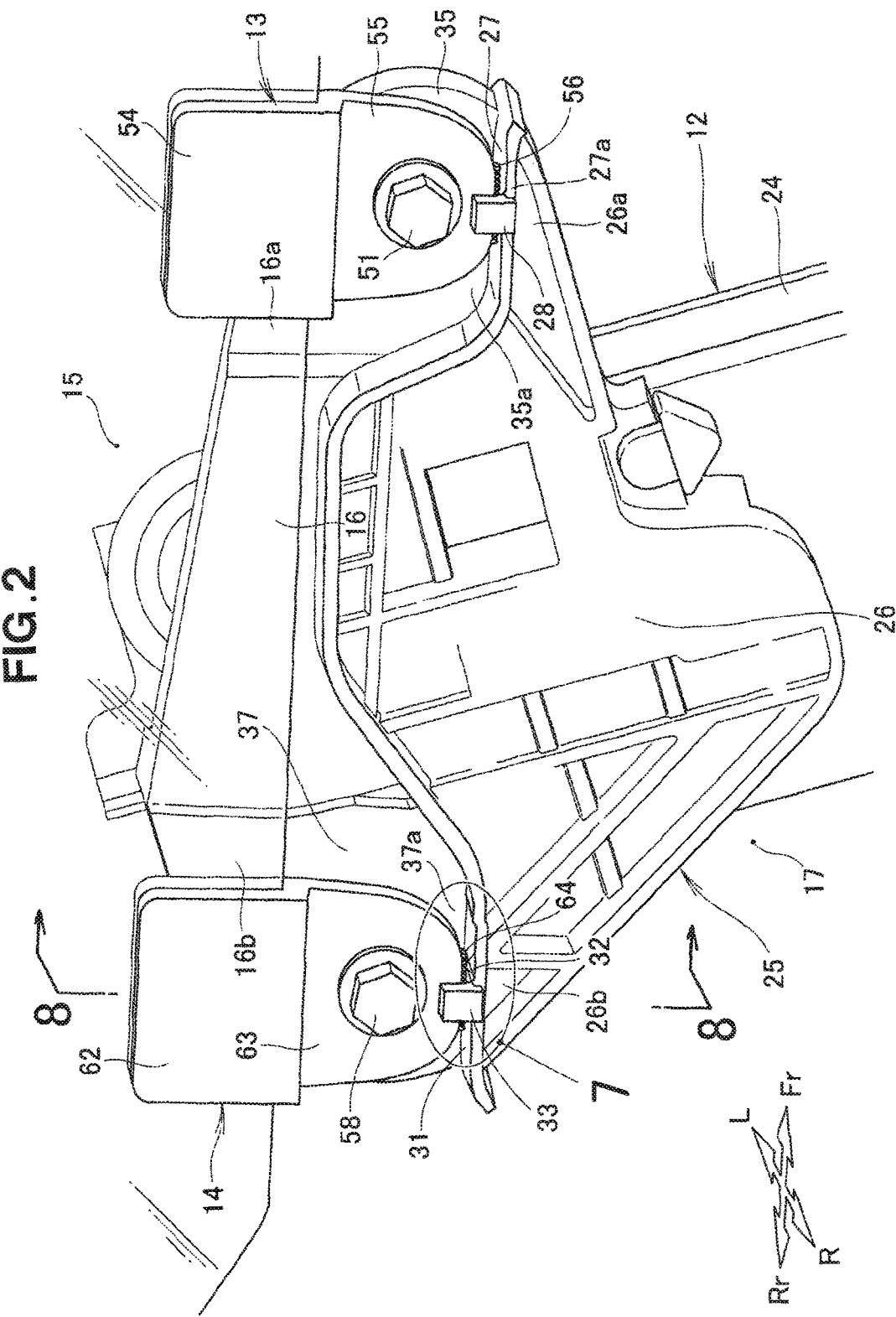
FIG. 2 is a perspective view of the front and rear glass holders and the carrier plate of FIG. 1.
Figure 3:
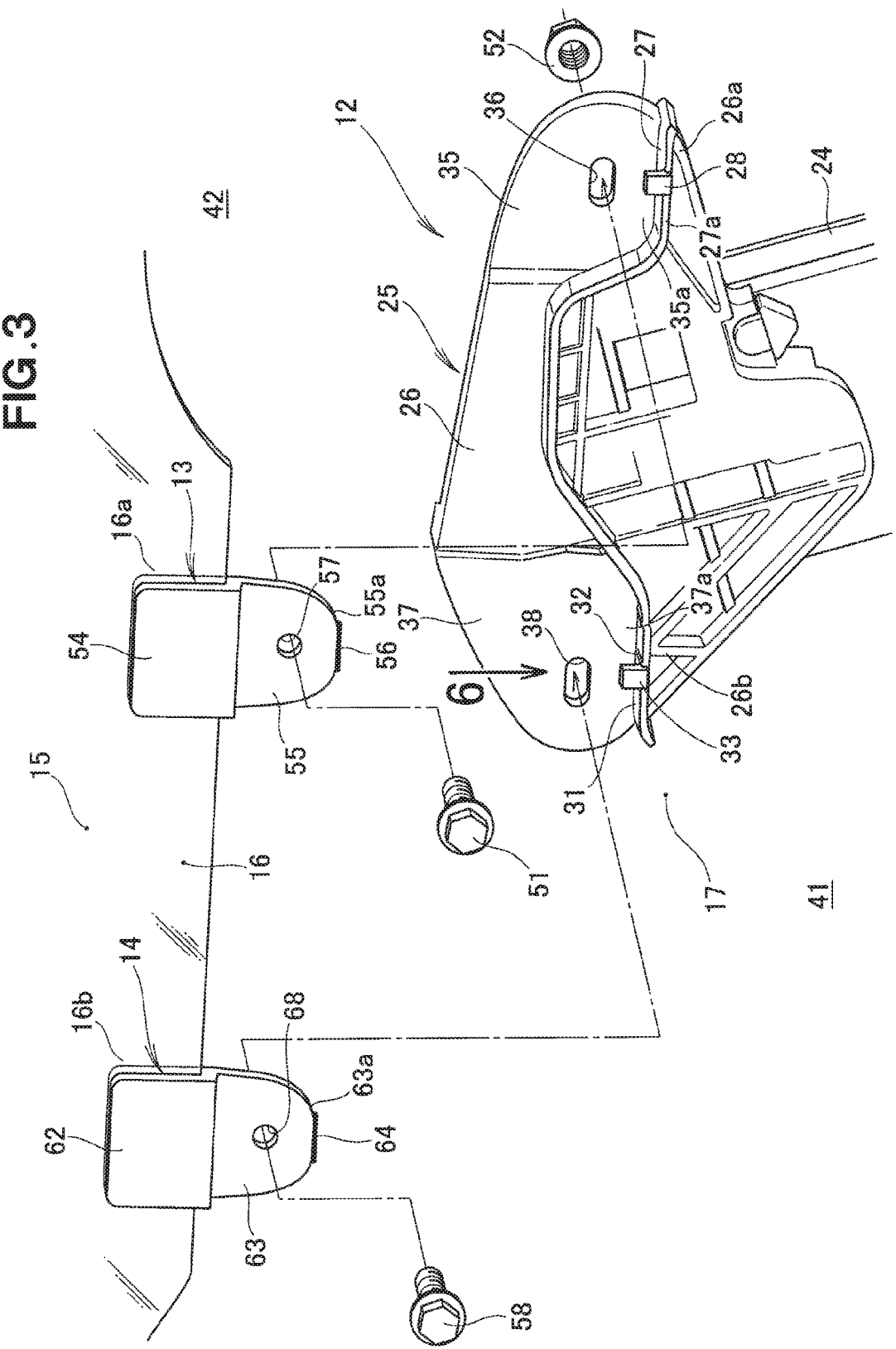
FIG. 3 is a disassembled perspective view of the front and rear glass holders disassembled from the carrier plate of FIG. 2.

The carrier plate 25 is a plastic member uniformly molded using a mold (metal mold), as shown in FIGS. 2 and 3.

The carrier plate 25 is provided with a plate body 26 elevatably supported along the guide section 24, a front placement section 27 provided to a front end section 26a of the plate body 26, a front pressing section 28 provided to the front placement section 27, a rear placement section 31 provided to a rear end section 26b of the plate body 26, a second engagement section 32 provided to the rear placement section 31, and a rear pressing section 33 provided to the rear placement section 31.

The plate body 26 has a front fastening wall 35 formed on the front end section 26a, a second front fastening hole 36 formed on the front fastening wall 35, a rear fastening wall 37 formed on the rear end section 26b, and a second rear fastening hole 38 formed on the rear fastening wall 37.

The second front fastening hole 36 and the second rear fastening hole 38 are long holes extending in the longitudinal direction of the vehicle body.

The front fastening wall 35 is provided to the vehicle exterior 42 (see FIG. 8) side of the front glass holder 13 and is thereby opposed by the front glass holder 13. In this state, the front glass holder 13 is attached to the front fastening wall 35.

The rear fastening wall 37 is provided to the vehicle exterior 42 side of the rear glass holder 14 and is thereby opposed by the rear glass holder 14. In this state, the rear glass holder 14 is attached to the rear fastening wall 37.

The front placement section 27 projects from a lower end section 35a of the front fastening wall 35 to the vehicle interior 41 (see FIG. 8 as well) side. The front placement section 27 is formed to allow the front glass holder 13 to be placed thereon facing a lower surface 55a. The lower surface 55a is formed on the lower section of a front fastening section 55 of the front glass holder 13. In other words, the lower surface 55a of the front fastening section 55 can be placed on the front placement section 27.

A front pressing section 28 is provided upright from a location below the second front fastening hole 36 on the inner side 27a of the vehicle interior 41 side of the front placement section 27. In other words, the front pressing section 28 is provided further toward the vehicle interior 41 relative to the front glass holder 13, and protrudes upward from the front placement section 27 so as to oppose the front glass holder 13.

Figure 4:
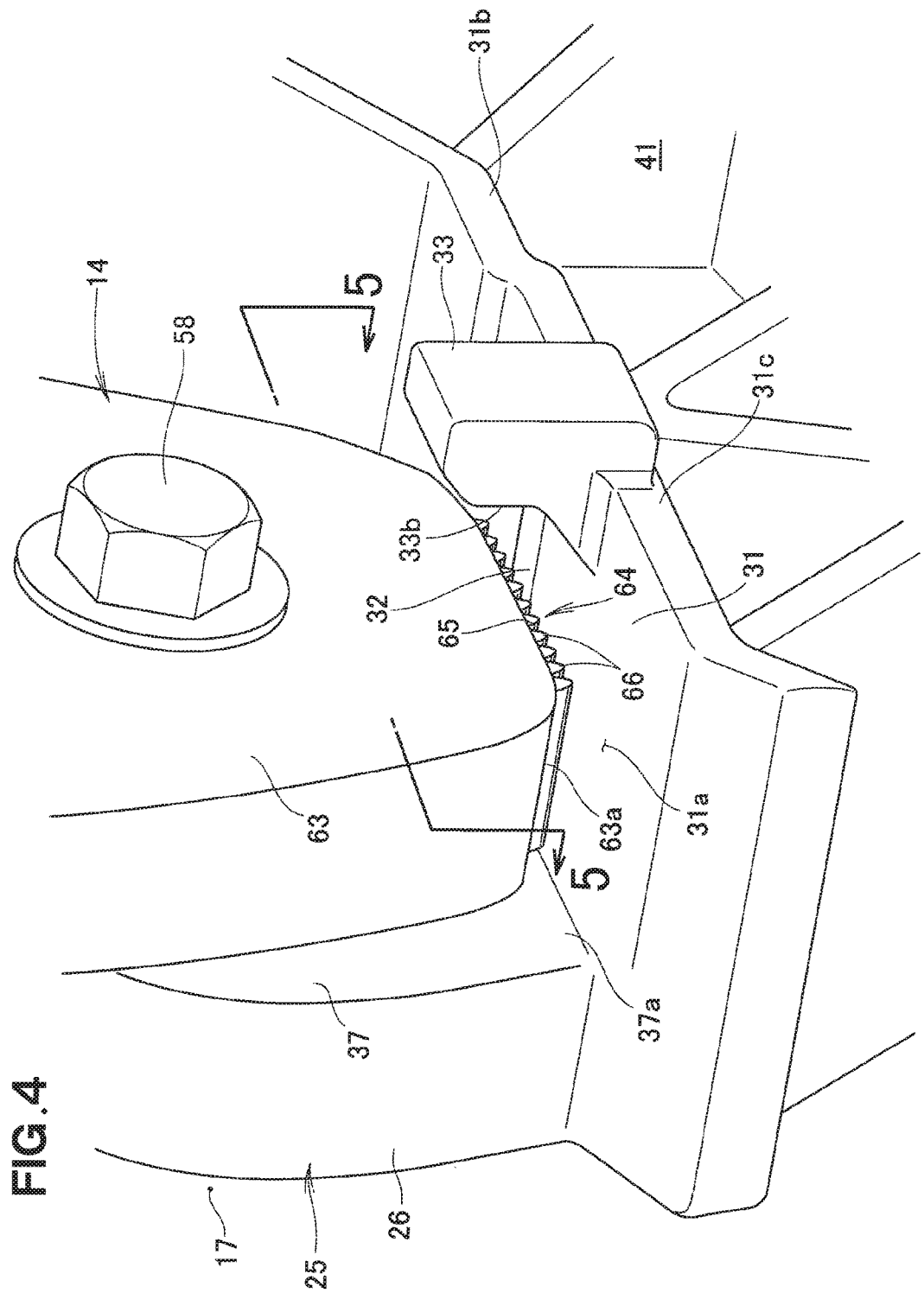
FIG. 4 is a perspective view of the rear glass holder and the carrier plate of FIG. 2 as seen from the rear side of the vehicle body.

As shown in FIG. 4, the rear placement section 31 projects from a lower end section 37a of the rear fastening wall 37 to the vehicle interior 41 side. The rear placement section 31 is formed to allow the rear glass holder 14 to be placed thereon facing a lower surface 63a. The lower surface 63a is formed on the lower section of a rear fastening section 63 of the rear glass holder 14. In other words, the lower surface 63a of the rear fastening section 63 can be placed on the rear placement section 31. The second engagement section 32 is formed on the rear placement section 31.

Figure 5:
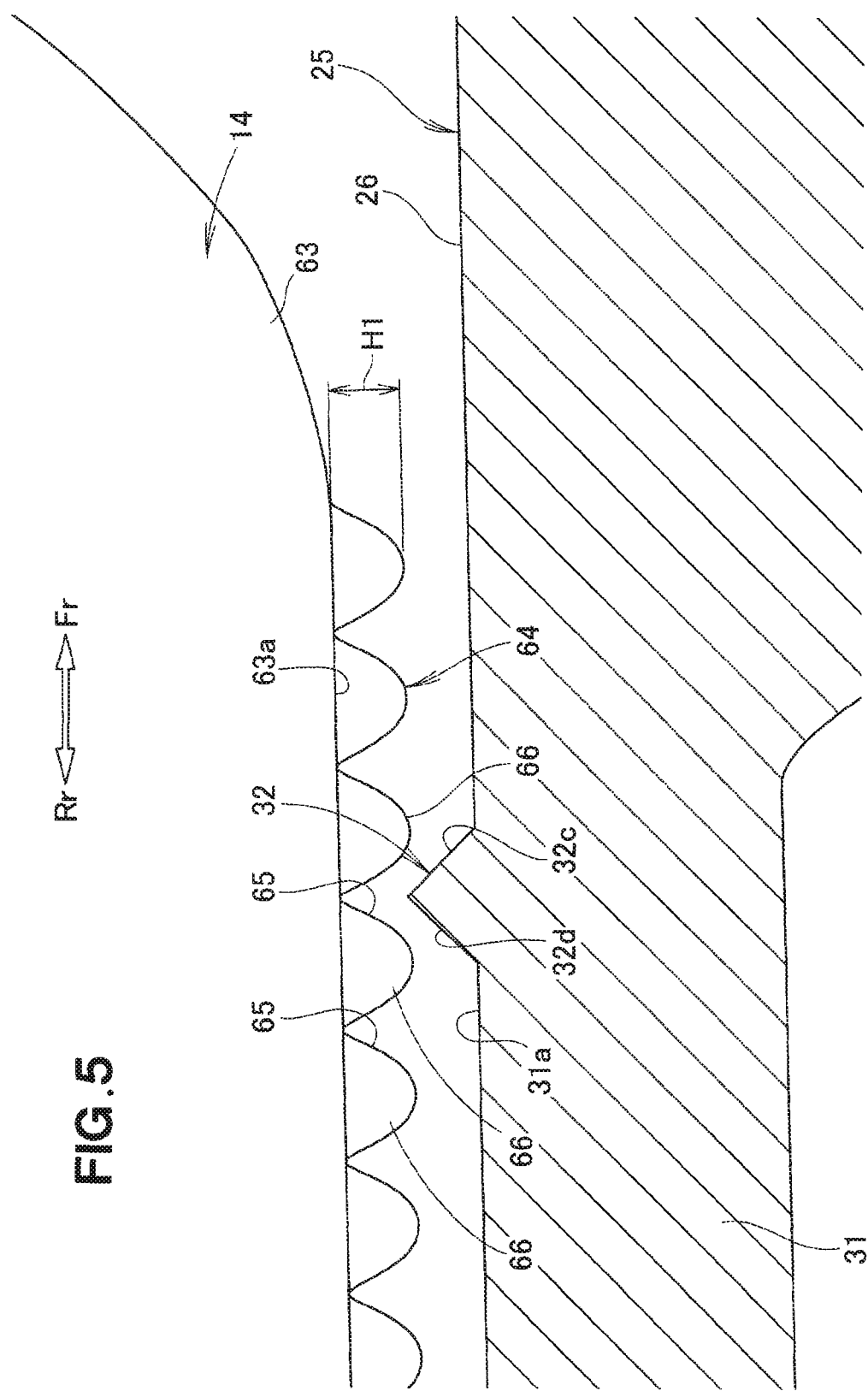
FIG. 5 is a cross-sectional view taken along line 5-5 of FIG. 4.
Figure 6:
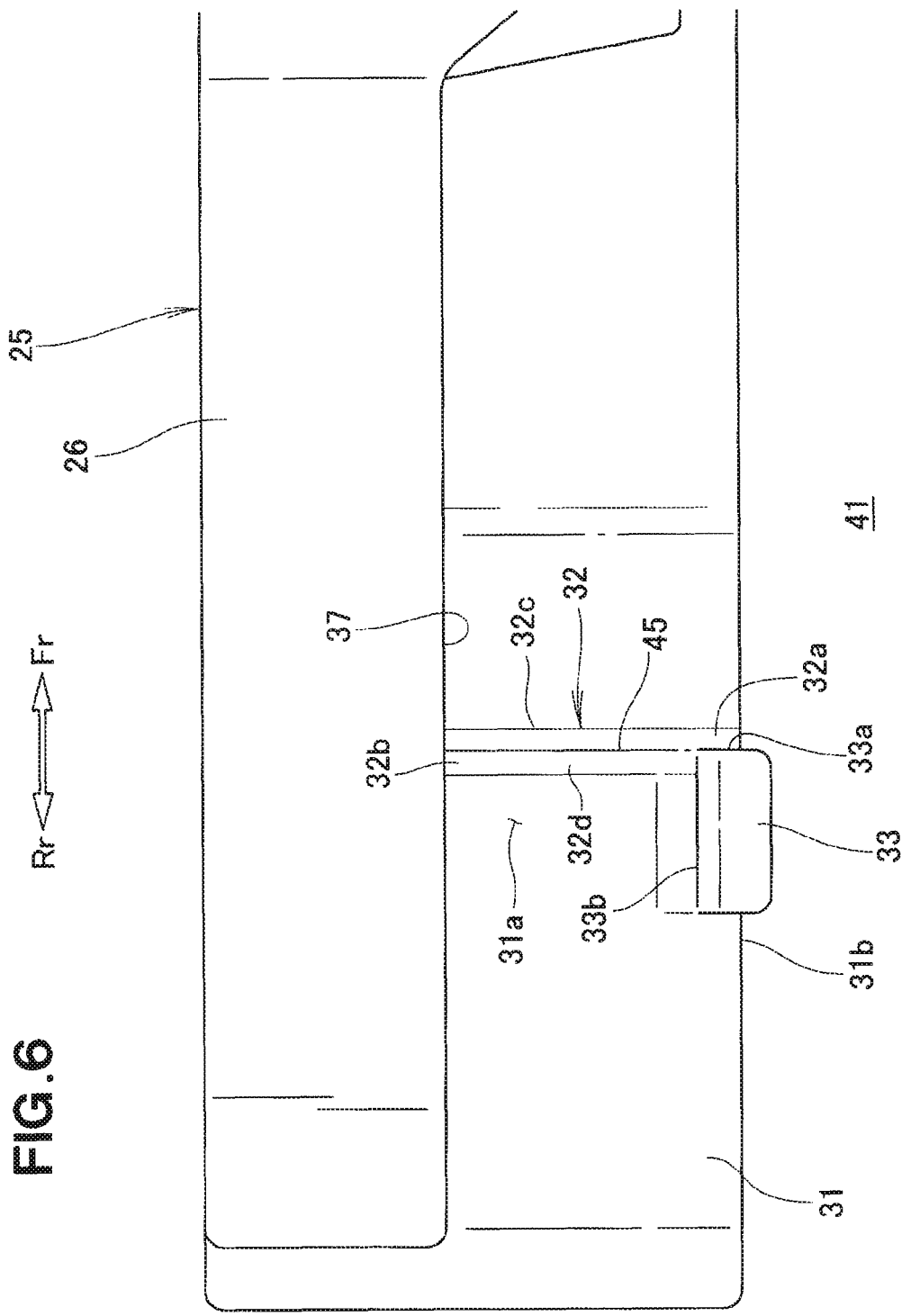
FIG. 6 is a view taken in the direction of arrow 6 of FIG. 3.

As shown in FIGS. 5 and 6, a single second engagement section 32 is provided in a position that corresponds to a first rear engagement section 64 of the rear glass holder 14 on the surface 31a of the rear placement section 31. Specifically, the second engagement section 32 is extended toward the lateral direction on the surface 31a of the rear placement section 31 and is thereby provided so as to straddle (cross) the rear fastening wall 37 and the rear pressing section 33.

Consequently, an inner side section 32a of the second engagement section 32 is connected to the rear pressing section 33, and an outer side section 32b of the second engagement section 32 is integrally connected to the rear fastening wall 37.

The second engagement section 32 is formed so as to protrude upward toward the lower surface 63a of the rear fastening section 63, and so as to allow engagement with a plurality of recesses 65 of the first rear engagement section 64.

In other words, the second engagement section 32 is formed in a substantially triangular shape in cross section by a front slope face 32c and a rear slope face 32d protruding in a convex shape.

Figure 7:
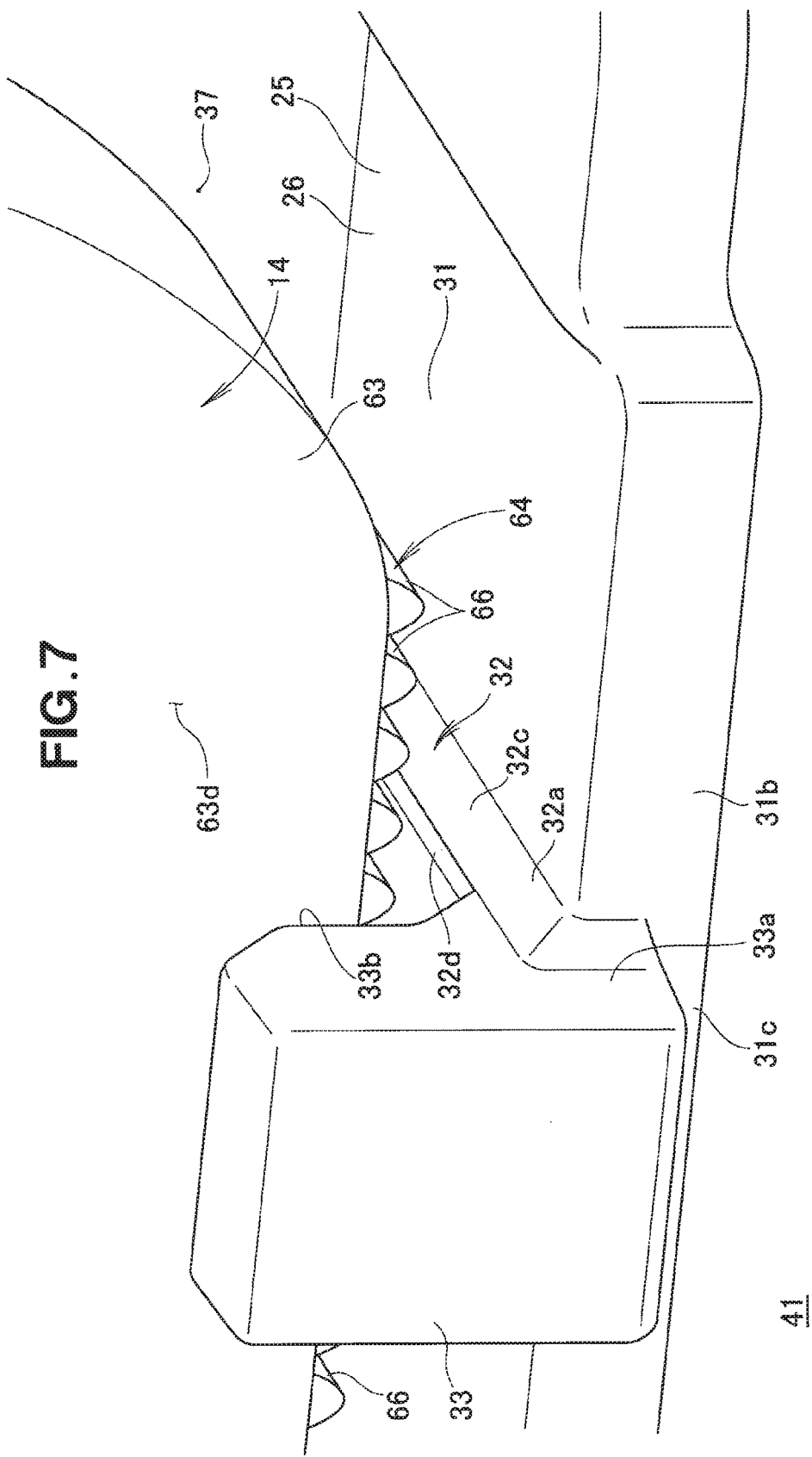
FIG. 7 is an enlarged view for section 7 of FIG. 2.

As shown in FIGS. 6 and 7, the rear pressing section 33 is provided upright from a location 31c below the second rear fastening hole 38 on the inner side 31b of the vehicle interior 41 side of the rear placement section 31 (i.e., a location adjacent to the inner side section 32a of the second engagement section 32).

The front lower section 33a of the rear pressing section 33 is connected to the inner side section 32a of the second engagement section 32.

The rear pressing section 33 is provided toward the vehicle interior 41 relative to the rear glass holder 14 and protrudes upward from the rear placement section 31 so as to oppose the rear glass holder 14.

The rear pressing section 33 is formed in a substantially rectangular shape as viewed from above, and is arranged so that the exterior surface 33b of the rear pressing section 33 opposes the inner surface 63d of the rear fastening section 63 of the rear glass holder 14.

The reason that the front pressing section 28 is made to oppose the front fastening section 55 of the front glass holder 13 (see FIG. 3) and the rear pressing section 33 is made to oppose the rear fastening section 63 of the rear glass holder 14 will be described in detail with reference to FIGS. 2 and 9.

The second engagement section 32 is furthermore formed so as to straddle the rear pressing section 33 and the rear fastening wall 37. Consequently, the second engagement section 32 and the rear pressing section 33 (specifically, the front lower section 33a of the rear pressing section 33) are provided in positions that overlap in the lateral direction.

The reason that the second engagement section 32 and the rear pressing section 33 are provided in positions that overlap in the lateral direction will be described with reference to FIG. 10.

Returning to FIGS. 2 and 3, the front glass holder 13 is fastened to the front fastening wall 35 of the carrier plate 25 via a bolt (fastening member) 51 and nut (fastening member) 52.

The front glass holder 13 is provided with a front fitting section 54 engaged with a front end section 16a of an attachment lower end 16 of the door glass 15, a front fastening section 55 projected downward from the front fitting section 54, and a first front engagement section 56 provided to the lower surface 55a of the front fastening section 55.

With the first front engagement section 56 placed on the front placement section 27, the second front fastening hole 36 is offset (displaced) downward by an offset amount L1 (see FIG. 9) in relation to the first front fastening hole 57.

The offset amount L1 will be described in detail with reference to FIG. 9.

The front glass holder 13 is a member similar to the rear glass holder 14, and the rear glass holder 14 will be described below with a description of the front glass holder 13 being omitted.

Figure 8:
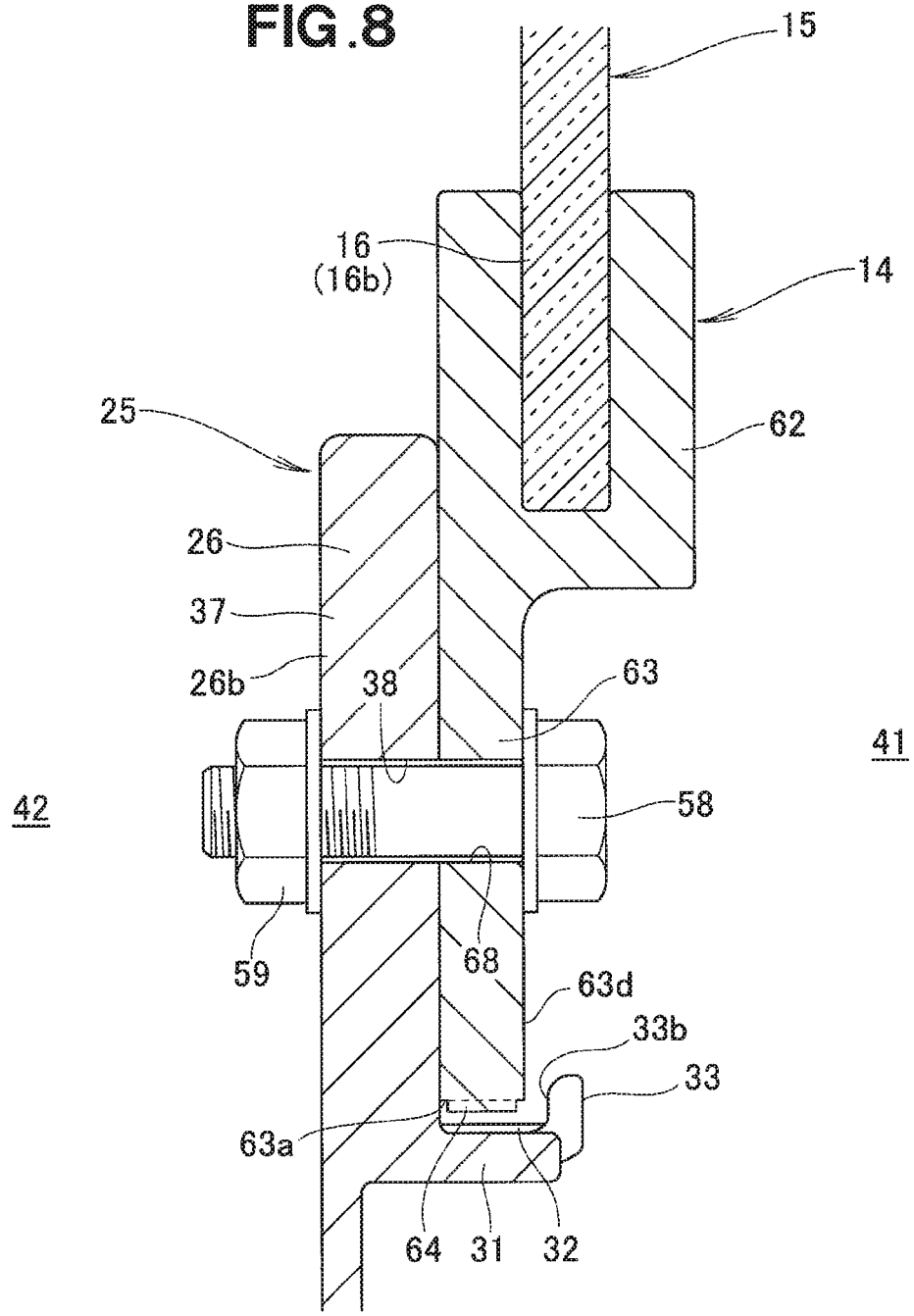
FIG. 8 is a cross-sectional view taken along line 8-8 of FIG. 2.

As shown in FIG. 8, the rear glass holder 14 is fastened to the rear fastening wall 37 via a bolt 58 (fastening member) and nut 59 (fastening member).

The rear glass holder 14 is provided with a rear fitting section 62 engaged with a rear end section 16b of the attachment lower end 16 of the door glass 15, a rear fastening section 63 projected downward from the rear fitting section 62, and a first rear engagement section 64 provided to the lower surface 63a of the rear fastening section 63.

The rear fastening section 63 is formed to be capable of contact with the rear fastening wall 37 and has a first rear fastening hole 68 formed in a position corresponding to the second rear fastening hole 38.

The first rear engagement section 64 is provided to a single glass holder (i.e., rear glass holder) 14 selected from the front and rear glass holders (i.e., the plurality of glass holders) 13, 14 (see FIG. 3).

As shown in FIGS. 4 and 5, the first rear engagement section 64 is provided to the lower surface 63a of the rear fastening section 63 across substantially the entire lateral direction. The first rear engagement section 64 is formed in a concavoconvex shape in the vertical direction to thereby have a plurality of recesses 65 and protrusions 66 formed in continuous alternating fashion toward the longitudinal direction of the vehicle body.

In the first rear engagement section 64, the plurality of protrusions 66 is formed in a smooth curved shape and the plurality of recesses 65 is formed in an acute triangular shape. Consequently, the height of the recesses 65 and the protrusions 66 is set to be H1.

An arbitrary location of the first rear engagement section 64 substantially in the horizontal direction (specifically, a single recess 65 selected from the plurality of recesses 65) is engaged with the second engagement section 32.

Consequently, the rear glass holder 14 can be held in a desired location in which the door glass 15 is in contact with the rear sash 22, as shown in FIG. 1.

Thus, the rear glass holder 14 is held by the second engagement section 32 and the recesses 65 of the first rear engagement section 64, whereby the door glass 15 can be positioned in a normal position with respect to the door body 11.

The reason that the plurality of protrusions 66 is formed in a smooth curved shape will be later described in detail.

Returning to FIGS. 4 and 5, the first rear engagement section 64 is formed with the plurality of recesses 65 and the plurality of protrusions 66 and the second engagement section 32 is formed in a single convex shape. Consequently, an optimal recess 65 can be selected from the plurality of recesses 65, and the selected recess 65 can be engaged with the second engagement section 32.

The rear glass holder 14 (i.e., the door glass 15 (see FIG. 1)) can be precisely positioned in a predetermined position.

For example, in the case that the second engagement section 32 has a plurality of convex shapes, the plurality of recesses 65 of the first rear engagement section 64 must be caused to engage the second engagement section 32 having the plurality of convex shapes. Accordingly, the first rear engagement section 64 and/or the second engagement section 32 must be precisely formed (molded).

Inasmuch, a single convex shape is formed as the second engagement section 32. Consequently, merely by causing a single recess 65 of the first rear engagement section 64 to engage with the second engagement section 32 having a single convex shape allows the rear glass holder 14 (i.e., door glass 15 (see FIG. 1)) to be positioned in a predetermined position.

It is therefore possible to reduce precision when the first rear engagement section 64 and/or the second engagement section 32 are formed (molded) to a greater extent than when the plurality of recesses 65 of the first rear engagement section 64 is caused to engage with the second engagement section 32 having a plurality of convex shapes.

As shown in FIGS. 2 and 3, the carrier plate 25 is configured so that the second engagement section 32 is provided only to the rear placement section 31 without a second engagement section being provided to the front placement section 27. The reason for this is described below.

The first front engagement section 56 and the first rear engagement section 64 are provided to the front and rear glass holders (i.e., the plurality of glass holders) 13, 14.

For example, when a second engagement section is provided to the front placement section 27 and the second engagement section 32 is provided to the rear placement section 31, the front-side second engagement section and the rear-side second engagement section 32 must be individually caused to engage both (all) the first front engagement section 56 and the first rear engagement section 64. It is difficult to cause the front-side second engagement section and the rear-side second engagement section 32 to advantageously engage (mesh with) the front and rear first front engagement sections 56, 64.

Inasmuch, the second engagement section 32 is provided only in a position that corresponds to the first rear engagement section 64 of the rear glass holder (a single glass holder) 14. Consequently, the front-side second engagement section and the rear-side second engagement section 32 are not required to be individually caused to engage both the first front engagement section 56 and the first rear engagement section 64.

The recesses 65 of the first rear engagement section 64 (see FIG. 5) can be caused to satisfactorily engage the second engagement section 32, and the door glass 15 can easily be positioned in a normal position.

Returning to FIG. 5, the second engagement section 32 is provided in an upward-facing convex shape to the surface 31a of the rear placement section 31, and the first rear engagement section 64 is provided to the lower surface 63a of the rear glass holder 14 (specifically, the rear fastening section 63). The first rear engagement section 64 is engaged from above by the second engagement section 32.

Consequently, the engaged state of the second engagement section 32 and the first rear engagement section 64 can be satisfactorily maintained using the deadweight of the door glass 15 (see FIG. 1) and/or the rear glass holder 14. The rear glass holder 14 (i.e., door glass 15) can thereby be precisely positioned in a predetermined position.

As shown in FIG. 2, the front pressing section 28 and the front fastening wall 35 are provided to the front end section 26a of the carrier plate 25 (specifically, the plate body 26). The front pressing section 28 is provided toward the vehicle interior 41 relative to the front fastening section 55 of the front glass holder 13, and the front fastening wall 35 is provided toward the vehicle interior 42 relative to the front fastening section 55.

Figure 9:
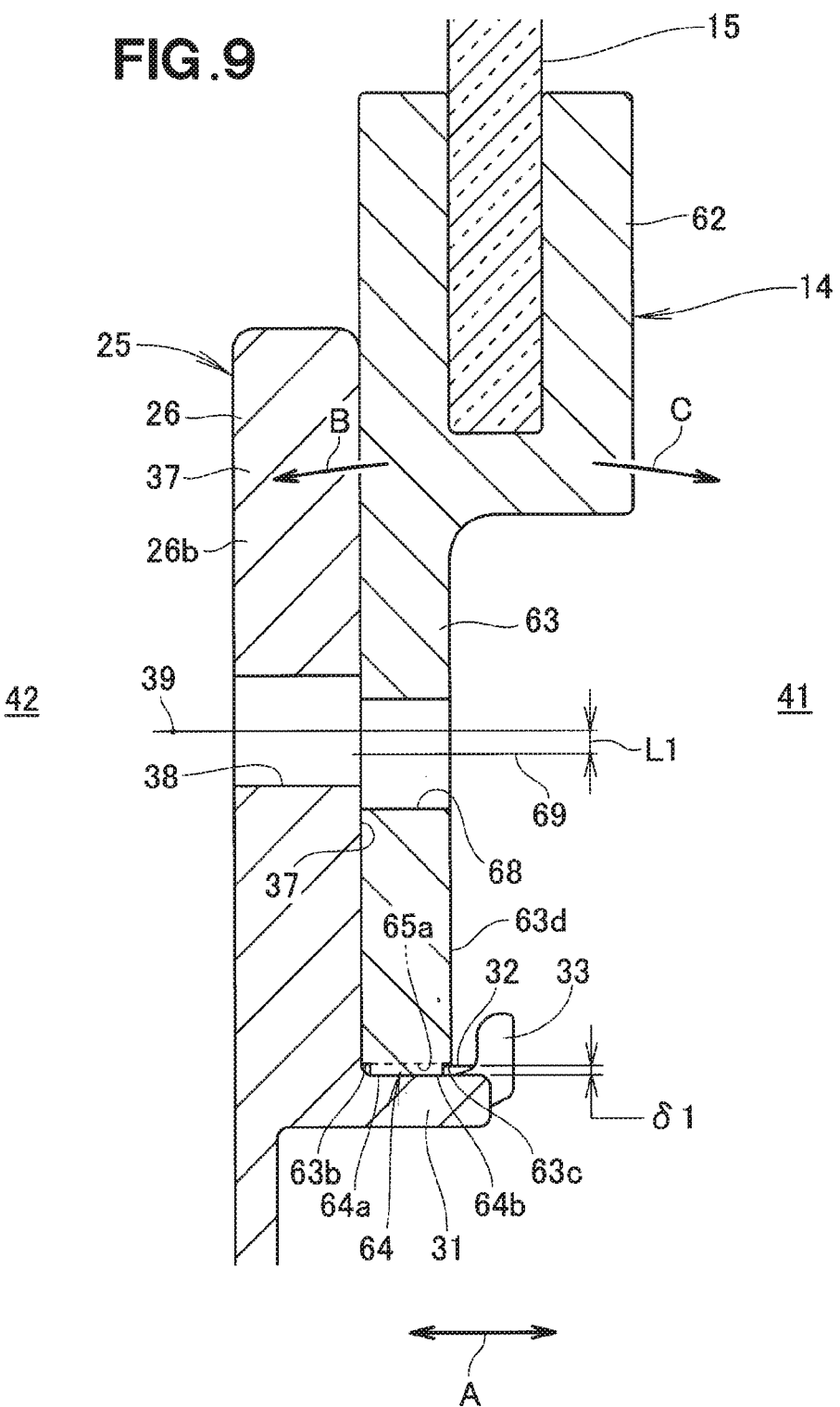
FIG. 9 is a cross-sectional view showing the state prior to the rear glass holder engaging the carrier plate of FIG. 8.

As shown in FIG. 9, the rear pressing section 33 and the rear fastening wall 37 are provided to the rear end section 26b of the carrier plate 25 (plate body 26). The rear pressing section 33 is provided toward the vehicle interior 41 relative to the rear fastening section 63 of the rear glass holder 14, and the rear fastening wall 37 is provided toward the vehicle exterior 42 relative to the rear fastening section 63.

Consequently, the front glass holder 13 is placed on the front placement section 27 of the carrier plate 25, and is held in this state by the front pressing section 28 and the front fastening wall 35, as shown in FIGS. 2 and 9.

Similarly, the rear glass holder 14 is placed on the rear placement section 31 of the carrier plate 25, and is held in this state by the rear pressing section 33 and the rear fastening wall 37.

The front fastening section 55 of the front glass holder 13 can be made to follow along the front fastening wall 35, and the rear fastening section 63 of the rear glass holder 14 can be made to follow along the rear fastening wall 37. Consequently, it is possible to prevent the front and rear glass holders 13, 14 from falling inward.

Work for attaching the door glass 15 in a normal position can thereby be carried out without a laborious procedure.

As shown in FIG. 9, the first rear engagement section 64 is provided to the lower surface 63a of the rear glass holder 14 (specifically, rear fastening section 63) for substantially the entire lateral direction (arrow A). Consequently, the first rear engagement section 64 can be formed to the vicinity of the end section 63b on the vehicle exterior side and/or the end section 63c on the vehicle interior side of the rear glass holder 14 (lower surface 63a).

Furthermore, the second engagement section 32 is provided so as to straddle (cross) the rear fastening wall 37 and the rear pressing section 33 (see FIG. 6 as well). In other words, the second engagement section 32 extends toward the vehicle interior 42 relative to a vehicle-exterior-side end section 64a of the first rear engagement section 64, and extends toward the vehicle interior 41 relative to a vehicle-interior-side end section 64b of the first rear engagement section 64.

Consequently, it is possible that the vehicle-interior-side end section 64b of the first rear engagement section 64 (i.e., the recesses 65 (see FIG. 5)) will become separated from the second engagement section 32 when, e.g., the rear glass holder 14 slightly tilts to the vehicle exterior 42 side in the manner indicated by arrow B.

In this case, the vehicle-exterior-side end section 64a side of the first rear engagement section 64 (recesses 65) is kept in a state engaged with the second engagement section 32.

Also, it is possible that the vehicle-exterior-side end section 64a of the first rear engagement section 64 (i.e., the recesses 65 (see FIG. 5)) will become separated from the second engagement section 32 when, e.g., the rear glass holder 14 slightly tilts to the vehicle interior 41 side as indicated by the arrow C.

In this case, the vehicle-interior-side end section 64b of the first rear engagement section 64 (recesses 65) is kept in a state engaged with the second engagement section 32.

Thus, the first rear engagement section (recesses 65) can be caused to engage the second engagement section 32 when the rear glass holder 14 has tilted slightly to the vehicle exterior 42 side or the vehicle interior 41 side.

The rear glass holder 14 (i.e., the door glass 15 (see FIG. 1)) can be precisely positioned in a predetermined position.

The engagement margin of the first rear engagement section 64 and the second engagement section 32 is set to δ1 with the first rear engagement section 64 (recesses 65 (see FIG. 5)) and the second engagement section 32 engaged.

Meanwhile, the center 69 of the first rear fastening hole 68 is offset (displaced) so as to be at an offset amount L1 below the center 39 of the second rear fastening hole 38 with the first rear engagement section 64 (recesses 65) engaged with the second engagement section 32.

The first front fastening hole 57 is offset so as to be at an offset amount L1 below the second front fastening hole 36 with the first front engagement section 56 placed on the front placement section 27, as shown in FIGS. 2 and 3.

As shown in FIGS. 3 and 9, the offset amount L1 of the first rear fastening hole 68 and the second rear fastening hole 38 and the offset amount L1 of the first front fastening hole 57 and the second front fastening hole 36 are set to be greater than the engagement margin δ1 of the first rear engagement section 64 (recesses 65) and the second engagement section 32.

In other words, the offset amounts are set so as accommodate the second rear fastening hole 38 being offset from the first rear fastening hole 68 and to accommodate the second front fastening hole 36 being offset from the first front fastening hole 57 with the first rear engagement section 64 engaged with the second engagement section 32.

As shown in FIGS. 2 and 3, a bolt 51 is passed through the first front fastening hole 57 and the second front fastening hole 36 to fasten the front glass holder 13 to the front fastening wall 35, whereby the front glass holder 13 is lifted upward by the offset amount L1.

Consequently, the first front engagement section 56 and the front placement section 27 are released from being in contact so that the first front engagement section 56 can be separated from the front placement section 27.

Also, a bolt 58 is passed through the first rear fastening hole 68 and the second rear fastening hole 38 to fasten the rear glass holder 14 to the rear fastening wall 37, whereby the rear glass holder 14 is lifted upward by the offset amount L1, as shown in FIGS. 2 and 8.

Consequently, the first rear engagement section 64 and the second engagement section 32 are released from being in contact, and the first rear engagement section 64 can be lifted above the second engagement section 32.

Thus, the first front engagement section 56 and the front placement section 27 are set apart from each other, and the first rear engagement section 64 and the second engagement section 32 are set apart from each other.

It is thereby possible to suppress the generation of noise caused by interference between the first front engagement section 56 and the front placement section 27, and/or interference between the first rear engagement section 64 and the second engagement section 32.

Returning to FIG. 1, the front glass holder 13 is fastened to the front fastening wall 35 via the bolt 51 and nut 52 (see FIG. 3), and the rear glass holder 14 is fastened to the rear fastening wall 37 via the bolt 58 and nut 59 (see FIG. 4). The door glass 15 is thereby held by the front glass holder 13 and the rear glass holder 14.

The door glass 15 is elevatably supported by the front sash 21 and the rear sash 22.

Here, the reason for molding the plurality of protrusions 66 provided to the first rear engagement section 64 in a smooth curved shape will be described in detail with reference to FIG. 5.

In other words, when, for example, both the recesses 65 and the protrusions 66 provided to the first rear engagement section 64 are formed in an acute triangular shape, the recesses 65 and the protrusions 66 become excessively high.

Accordingly, the first rear engagement section 64 must be lifted more than required and it becomes more difficult to remove the first rear engagement section 64 from the second engagement section 32 when the first rear engagement section 64 has been fitted to the second engagement section 32 in order to position the door glass 15 in a normal position.

On the other hand, when both the recesses 65 and the protrusions 66 provided to the first rear engagement section 64 are formed smoothly curved, the recesses 65 and the protrusions 66 are excessively short.

Consequently, the first rear engagement section 64 is too readily removed from the second engagement section 32 when the first rear engagement section 64 has been fitted to the second engagement section 32 in order to position the door glass 15 in a normal position. Accordingly, it is possible that the door glass 15 will become displaced from the normal position.

Inasmuch, the protrusions 66 of the first rear engagement section 64 are formed smoothly curved, and the recesses 65 are formed with an acute triangular shape, as shown in FIG. 5. The height H1 between the recesses 65 and the protrusions 66 can be kept to an optimum value.

Consequently, the first rear engagement section 64 can be made less likely to be dislodged from the second engagement section 32 when the recesses 65 of the first rear engagement section 64 have been fitted to the second engagement section 32 in order to position the door glass 15 (see FIG. 1) in a normal position.

The door glass 15 can be thereby stably positioned in a normal position.

Keeping the height of the recesses 65 and the protrusions 66 to an optimum value allows the recesses 65 to be readily removed from the second engagement section 32 after the recesses 65 of the first rear engagement section 64 have been fitted to the second engagement section 32.

Thus, the door glass 15 can be stably positioned in a normal position, and the first rear engagement section 64 (recesses 65) can be readily removed from the second engagement section 32.

Work for attaching the door glass 15 in a normal position can thereby be carried out without a laborious procedure.

Next, an example of molding the carrier plate 25 will be described with reference to FIG. 10.

Figure 10:
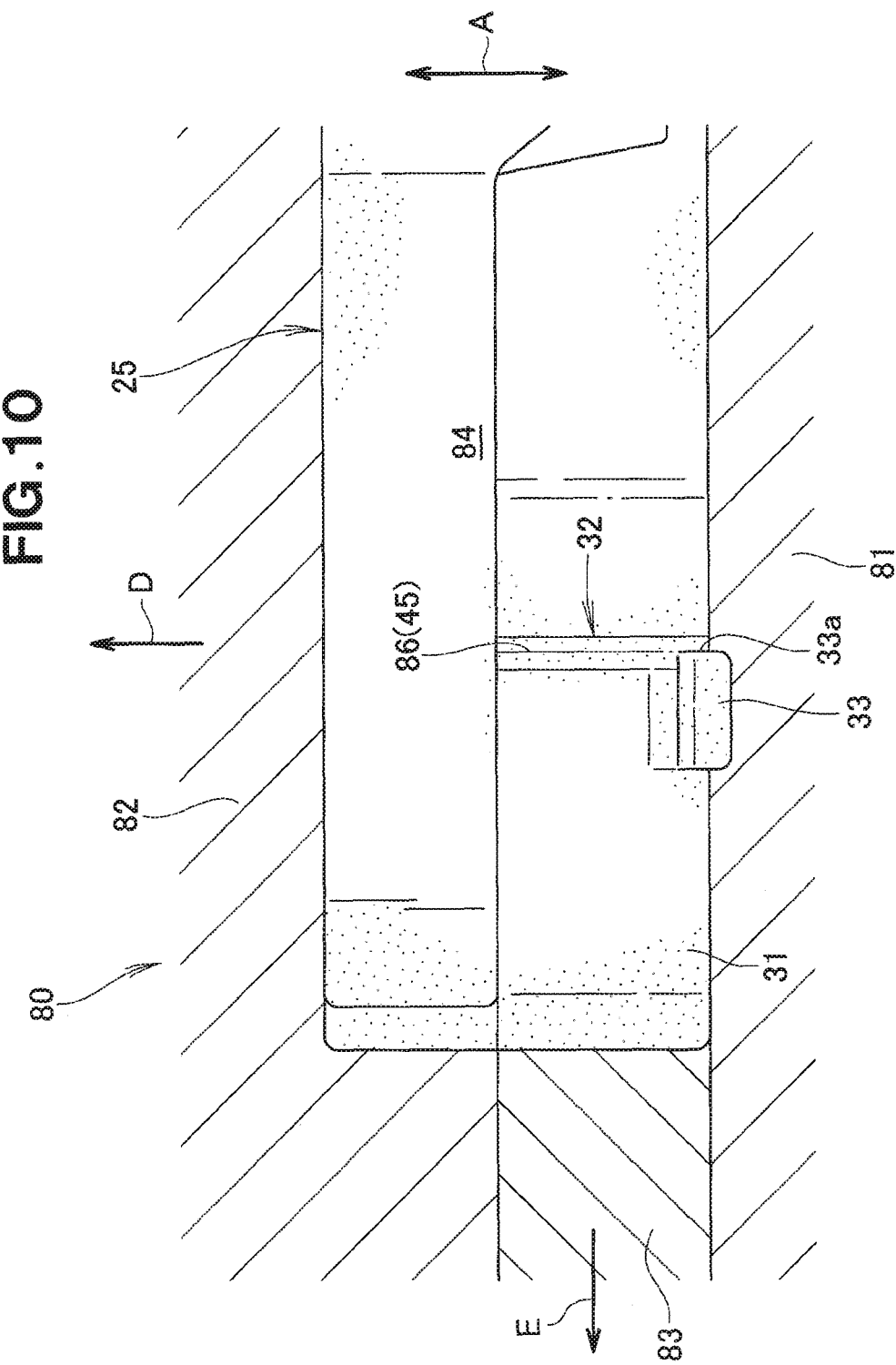
FIG. 10 is a view illustrating an example of the carrier plate according to the present invention being molded using a mold.

Molten resin is charged into a cavity 84, with a stationary mold 81, a movable mold 82, and a slide mold 83 of a mold (metal mold) 80 in a closed state, as shown in FIG. 10.

In this case, the carrier plate 25 is provided with the rear pressing section 33.

Consequently, the mold 80 is provided with a slide mold 83 for molding the rear pressing section 33.

The molten resin in the cavity 84 is allowed to solidify, whereupon the movable mold 82 is opened in the direction of the arrow D, and the slide mold 83 is opened in the direction of the arrow E, whereby the carrier plate 25 is taken out from the mold 80.

The second engagement section 32 and the rear pressing section 33 (front lower section 33a) of the carrier plate 25 are provided to overlapping positions in the lateral direction (arrow A). Consequently, the second engagement section 32 can be formed on the parting line trace 45 of the carrier plate 25 using the mold-dividing line (parting line) 86 of the stationary mold 81 and the slide mold 83.

Thus, the second engagement section 32 is molded using the slide mold 83 for molding the rear pressing section 33, whereby the mold 80 can be simplified.

Furthermore, forming the second engagement section 32 using the parting line trace 45 of the carrier plate 25 allows other locations of the carrier plate 25 to be molded without being affected by the second engagement section 32.

The molding precision of other locations of the support plate 25 can therefore be increased.

Next, an example of attaching the door glass 15 to the carrier plate 25 will be described with reference to FIGS. 11A to 13B.

Figure 11A:
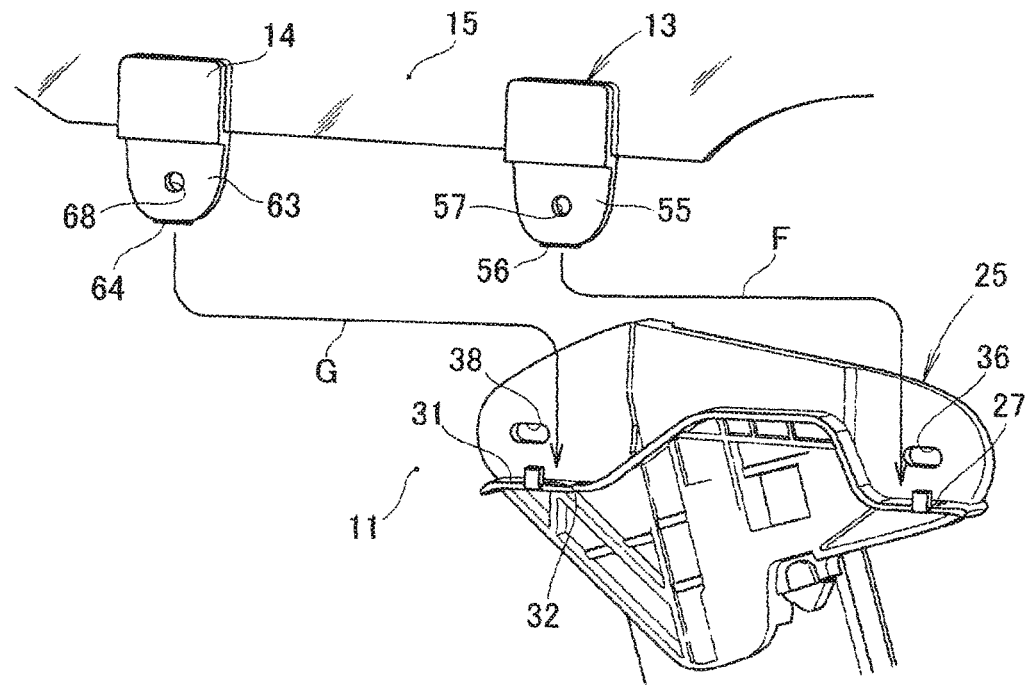
FIGS. 11A, 11B are views illustrating an example in which the first rear engagement section is caused to engage the second engagement section by the front and rear glass holders being placed on the carrier plate according to the present invention.

The first front engagement section 56 of the front glass holder 13 is placed on the front placement section 27 of the carrier plate 25 in the manner indicated by arrow F, as shown in FIG. 11A.

At the same time, the first rear engagement section 64 (specifically, the recesses 65 (see FIG. 5)) of the rear glass holder 14 is caused to engage the rear placement section 31 (specifically, the second engagement section 32) of the carrier plate 25 in the manner indicated by arrow G.

Figure 11B:
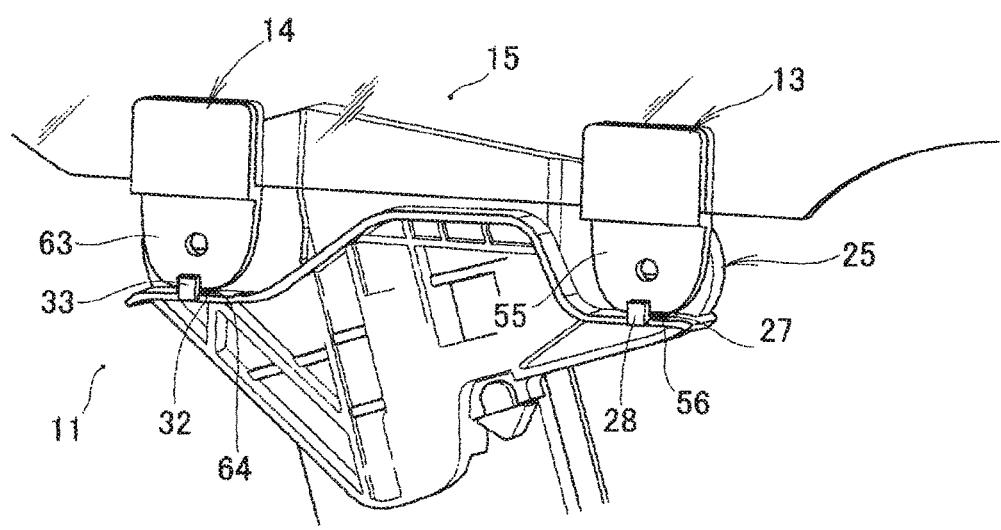

The recesses 65 of the first rear engagement section 64 engage the second engagement section 32, whereby the door glass 15 holds the rear glass holder 14 in a desired position in which the door glass 15 is caused to be in contact with the rear sash 22 (see FIG. 1), as shown in FIG. 11B.

The door glass 15 can be thereby positioned in a normal position with respect to the door body 11 (see FIG. 1 as well).

Figure 12A:
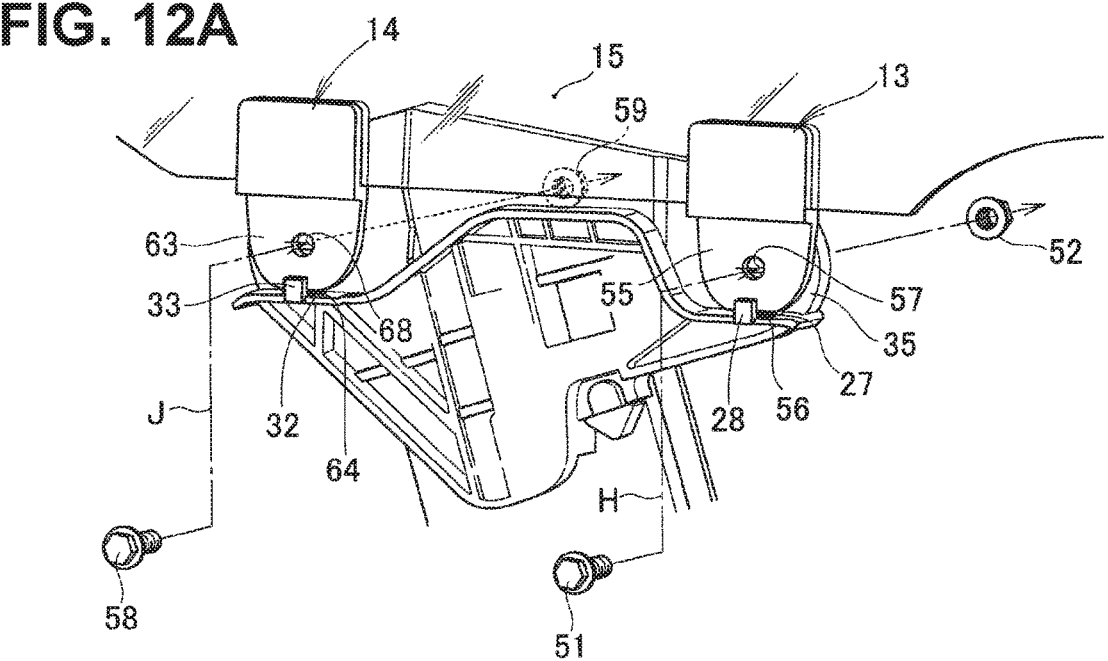
FIGS. 12A, 12B are views illustrating an example in which the front and rear glass holders are fastened to the carrier plate according to the present invention.

The bolt 51 is passed through the first front fastening hole 57 and the second front fastening hole 36 (see FIG. 11A) in the manner indicated by arrow H, as shown in FIG. 12A. The first front engagement section 56 is thereby lifted upward and separated from the front placement section 27.

In this state, the front glass holder 13 is fastened to the front fastening wall 35 using the bolt 51 and nut 52.

Figure 12B:
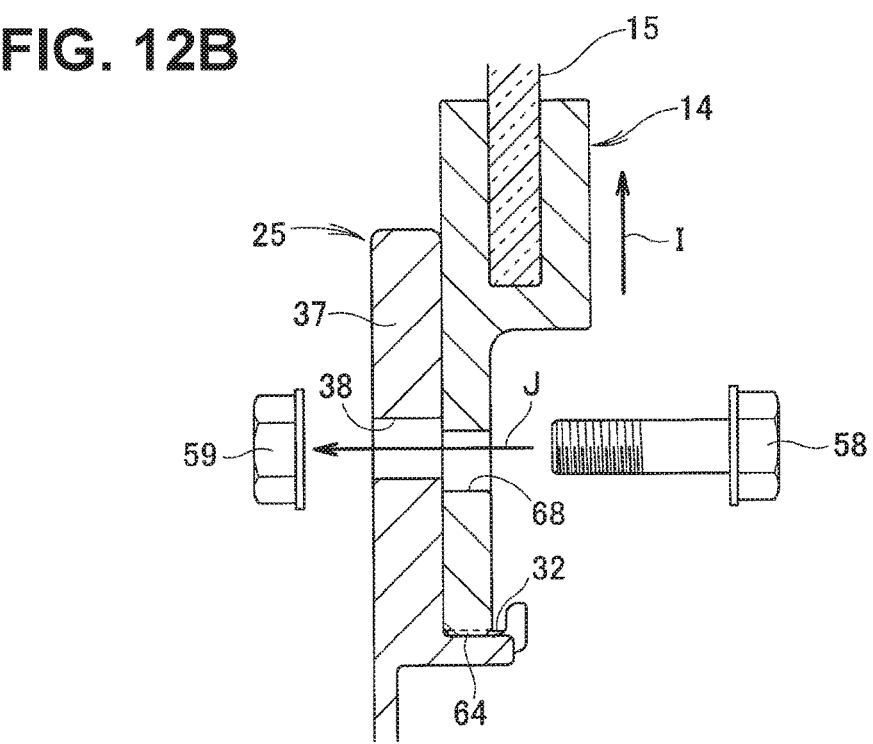

The recesses 65 of the first rear engagement section 64 (see FIG. 5) are lifted upward in the manner indicated by arrow I, and the first rear fastening hole 68 is coaxially arranged with respect to the second rear fastening hole 38, as shown in FIG. 12B. In this state, the bolt 58 is passed through the first rear fastening hole 68 and the second rear fastening hole 38 in the manner indicated by arrow J.

Figure 13A:
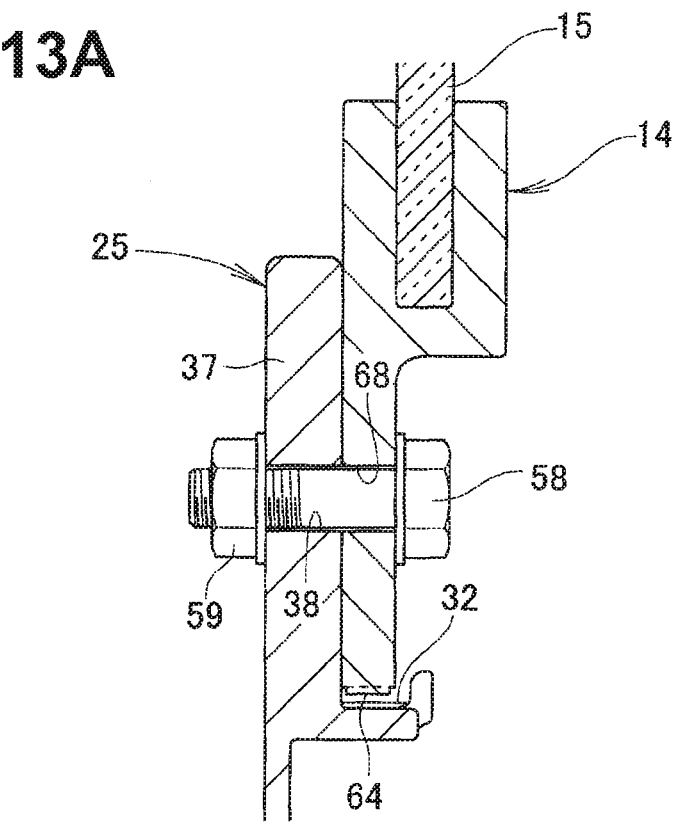
FIGS. 13A, 13B are views illustrating an example in which the carrier plate is attached with the door glass according to the present invention being positioned in a normal position with respect to the door body.

The recesses 65 of the first rear engagement section 64 (see FIG. 5) are lifted above the second engagement section 32, and the first rear engagement section 64 (recesses 65) and second engagement section 32 are disengaged, as shown in FIG. 13A.

In this state, the rear glass holder 14 is fastened to the rear fastening wall 37 using the bolt 58 and nut 59.

Figure 13B:
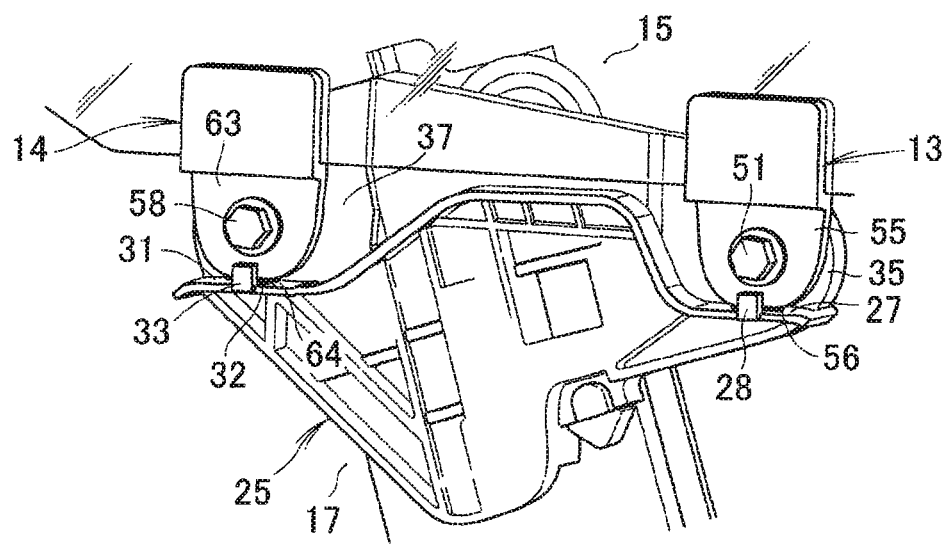

The front fastening section 55 of the front glass holder 13 is fastened to the front fastening wall 35 using the bolt 51 and nut 52 (see FIG. 12A), as shown in FIG. 13B. Furthermore, the rear fastening section 63 of the rear glass holder 14 is fastened to the rear fastening wall 37 using the bolt 58 and nut 59 (see FIG. 13A).

The carrier plate 25 can thereby be attached with the door glass 15 positioned in a normal position with respect to the door body 11.

Furthermore, attaching the door glass 15 to the carrier plate 25 makes it possible to separate the first front engagement section 56 upward from the front placement section 27, and to lift the recesses 65 of the first rear engagement section 64 (see FIG. 5) above the second engagement section 32.

It is thereby possible to suppress the generation of noise caused by interference between the first front engagement section 56 and the front placement section 27, and/or interference between the first rear engagement section 64 and the second engagement section 32.

The vehicle door according to the present invention can be suitably modified, improved, or otherwise changed without limitation to the embodiments described above.

For example, in the embodiment, an example was described in which the protrusions 66 of the first rear engagement section 64 are formed in a smooth curved shape and the recesses 65 are formed in an acute triangular shape, but no limitation is imposed thereby; the protrusions 66 may be formed in an acute triangular shape, and the recesses 65 may be formed in a smooth curved shape.

In the embodiment, an example was described in which an elevatable carrier plate 25 is indicated as the support plate, and the front and rear glass holders 13, 14 are fastened to the carrier plate 25, but no limitation is imposed thereby; the front and rear glass holders 13, 14 may be fastened to the support plate secured to the door body 11.

Furthermore, in the embodiments, the front and rear glass holders 13, 14 were exemplified as the plurality of glass holders for holding the door glass, but no limitation is imposed thereby; it is also possible to use three or another plurality of glass holders.

Also, the shape and configuration of the vehicle door, door body, rear door holder, door glass, carrier plate, rear placement section, second engagement section, rear pressing section, rear fastening wall, second rear fastening hole, parting line trace, rear fastening section, lower surface, first rear engagement section, recesses, protrusions, and first rear fastening hole, and the like indicated in the embodiment are not limited description above and may be suitably modified.

INDUSTRIAL APPLICABILITY

The present invention is advantageously applied to an automotive vehicle provided with a vehicle door in which a door glass is held by a glass holder, and the glass holder is attached to the door body via a support plate.

REFERENCE SIGNS LIST

10: vehicle door, 11: door body, 13: front glass holder (glass holder), 14: rear glass holder (glass holder), 15: door glass, 25: carrier plate (support plate), 31: rear placement section (placement section), 32: second engagement section, 33: rear pressing section (pressing section), 37: rear fastening wall (fastening wall), 38: second rear fastening hole (second fastening hole), 41: vehicle interior, 42: vehicle exterior, 45: parting line trace, 58, 59: bolt, nut (fastening member), 63: rear fastening section, 63a: lower surface, 64: first rear engagement section (first engagement section), 65: recesses, 66: protrusions, 68: first rear fastening hole (first fastening hole), L1: offset amount, δ1: engagement margin

The invention claimed is:
1. A vehicle door comprising:
a door glass supported by a door body;
a glass holder for holding the door glass and having a first fastening hole; and
a support plate provided to the door body and having a second fastening hole corresponding to the first fastening hole of the glass holder, the support plate being fastened to the glass holder by a fastening member passed through the first and second fastening holes,
wherein the glass holder has a first engagement section,
the support plate has a second engagement section configured to be engaged by the first engagement section to position the glass holder relative to the door body in a substantially horizontal direction when the fastening member is not passed through the first and second fastening holes,
the first fastening hole is offset downward relative to the second fastening hole when the fastening member is not passed through the first and second fastening holes and the first engagement section is engaged with the second engagement section, and an amount of offset of the first fastening hole and the second fastening hole is set such that when the fastening member is passed through the first and second fastening holes to fasten the glass holder and the support plate to each other and the offset of the first fastening hole and the second fastening hole is removed, the first and second engagement sections are disengaged from each other.

2. The vehicle door of claim 1, wherein the first engagement section comprises a plurality of recesses and protrusions formed in continuous alternating fashion in a lower surface of the glass holder, and the second engagement section includes one or more protrusions formed in a surface of the support plate opposing the lower surface of the glass holder such that the one or more protrusions of the second engagement section can be engaged in one or more of the recesses.

3. The vehicle door of claim 2, wherein the second engagement section comprises only a single protrusion.

4. The vehicle door of claim 3, wherein the vehicle door comprises a plurality of glass holders for holding the door glass, and the second engagement section is provided only in a part of the support plate corresponding to the first engagement section provided to a selected one of the plurality of glass holders.

5. The vehicle door of claim 2, wherein each of the protrusions in the first engagement section is formed to be smoothly curved while each of the recesses in the first engagement section is formed with an acute triangular shape or each of the protrusions in the first engagement section is formed with an acute triangular shape while each of the recesses in the first engagement section is formed to be smoothly curved.

6. The vehicle door of claim 5, wherein the vehicle door comprises a plurality of glass holders for holding the door glass, and the second engagement section is provided only in a part of the support plate corresponding to the first engagement section provided to a selected one of the plurality of glass holders.

7. The vehicle door of claim 2, wherein the vehicle door comprises a plurality of glass holders for holding the door glass, and the second engagement section is provided only in a part of the support plate corresponding to the first engagement section provided to a selected one of the plurality of glass holders.

8. The vehicle door of claim 2, wherein the support plate comprises a placement section on which the lower surface of the glass holder is to be place before the glass holder is fastened to the support plate, the second engagement section is provided to the placement section of the support plate, and the first engagement section is provided to the lower surface of the glass holder, such that the first and second engagement sections engage each other when the lower surface of the glass holder is placed on the placement section of the support plate.

9. The vehicle door of claim 8, wherein the support plate comprises:
a pressing section provided on a vehicle interior side of the glass holder, the pressing section extending upward from the placement section so as to oppose one side of the glass holder; and
a fastening wall provided on a vehicle exterior side of the glass holder, the fastening wall extending upward from the placement section so as to oppose another side of the glass holder, the second fastening hole being formed in the fastening wall.

10. The vehicle door of claim 9, wherein the support plate is a plastic member, and the second engagement section and the pressing section are provided to overlap each other as viewed in a lateral direction of a vehicle.

11. The vehicle door of claim 1, wherein the vehicle door comprises a plurality of glass holders for holding the door glass, and the second engagement section is provided only in a part of the support plate corresponding to the first engagement section provided to a selected one of the plurality of glass holders.

12. The vehicle door of claim 11, wherein the support plate comprises a plurality of placement sections on which lower surfaces of the plurality of glass holders are to be placed before the plurality of glass holders are fastened to the support plate, the second engagement section is provided to one of the placement sections of the support plate corresponding to the selected one of the plurality of glass holders, and the first engagement section is provided to the lower surface of the selected one of the plurality of glass holders, such that the first and second engagement sections engage each other when the lower surface of the selected one of the plurality of glass holders is placed on the one of the plurality of placement sections of the support plate.

13. The vehicle door of claim 1, wherein the support plate comprises a placement section on which a lower surface of the glass holder is to be placed before the glass holder is fastened to the support plate, the second engagement section is provided to the placement section of the support plate, and the first engagement section is provided to the lower surface of the glass holder, such that the first and second engagement sections engage each other when the lower surface of the glass holder is placed on the placement section of the support plate.

14. The vehicle door of claim 13, wherein the support plate comprises:
a pressing section provided on a vehicle interior side of the glass holder, the pressing section extending upward from the placement section so as to oppose one side of the glass holder; and
a fastening wall provided on a vehicle exterior side of the glass holder, the fastening wall extending upward from the placement section so as to oppose another side of the glass holder, the second fastening hole formed in the fastening wall.

15. The vehicle door of claim 14, wherein the support plate is a plastic member, and the second engagement section and the pressing section are provided to overlap each other as viewed in a lateral direction of a vehicle.

16. The vehicle door of claim 15, wherein the first engagement section is provided to the lower surface of the glass holder over a substantially entire lateral width of the lower surface, and the second engagement section is provided so as to extend from the fastening wall to the pressing section.

17. The vehicle door of claim 14, wherein the first engagement section is provided to the lower surface of the glass holder over a substantially entire lateral width of the lower surface, and the second engagement section is provided so as to extend from the fastening wall to the pressing section.

* * * * *